US012800954B2

(12) United States Patent
Finkel et al.

(10) Patent No.: US 12,800,954 B2
(45) Date of Patent: Nov. 17, 2026

(54) OPTICAL MODULATOR UTILIZING FERROELECTRIC DOMAIN SWITCHING

(71) Applicant: The Government of the United States of America, as represented by the Secretary of the Navy, Arlington, VA (US)

(72) Inventors: Peter Finkel, Baltimore, MD (US); Thomas Mion, Ellicott City, MD (US); Margo Staruch, Alexandria, VA (US); Jakub Kolacz, Alexandria, VA (US); Alex Moser, Fort Washington, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 353 days.

(21) Appl. No.: 18/379,934

(22) Filed: Oct. 13, 2023

(65) Prior Publication Data

US 2024/0126108 A1 Apr. 18, 2024

Related U.S. Application Data

(60) Provisional application No. 63/415,805, filed on Oct. 13, 2022.

(51) Int. Cl.
*G02F 1/05* (2006.01)

(52) U.S. Cl.
CPC ...................................... *G02F 1/05* (2013.01)

(58) Field of Classification Search
CPC ........ G02F 1/05; G02F 1/0533; G02F 1/0541; G02F 1/03; G02F 1/0344; G02F 1/0356; G02F 1/0316; G02F 1/0353; G02F 1/0305; G02F 1/225; G02F 1/2255; G02F 1/2257; G02B 5/00; G02B 5/008; G02B 5/18; G02B 5/1842; G02B 5/1857; G02B 5/1828; H01S 3/10; H01S 3/107; H01S 3/115; H01S 3/0085
USPC ....... 359/245, 254, 237, 247, 275–279, 323, 359/322, 315
See application file for complete search history.

(56) References Cited

U.S. PATENT DOCUMENTS 3,741,627 A * 6/1973 Haertling ................ G02F 1/055 359/254

OTHER PUBLICATIONS

Liu et al. "Ferroelectric crystals with giant electro-optic property enabling ultracompact Q-switches"; Science 376, Apr. 22, 2022, p. 1-7. (Year: 2022).*

* cited by examiner

*Primary Examiner* — Jie Lei
(74) *Attorney, Agent, or Firm* — US Naval Research Laboratory; Suresh Koshy

(57) ABSTRACT

The present invention provides an optical switch capable of functioning as an optical limiter, modulator, and dynamic attenuator utilizing a ferroelectric single crystal as the functional medium. The functionality is based upon a dynamic ferroelectric-to-ferroelectric phase transition occurring in the single crystal which can be perturbed through a hysteretic transition from an opaque to transparent state through the application of a compressive stress, an electric field, or both to the crystal.

14 Claims, 5 Drawing Sheets

No Stress and/or Voltage Applied (Opaque State)

With Stress and/or Voltage Applied (Transparent State)

OPTICAL MODULATOR UTILIZING FERROELECTRIC DOMAIN SWITCHING

PRIORITY CLAIM

The present application is a non-provisional application claiming the benefit of U.S. Provisional Application No. 63/415,805, filed on Oct. 13, 2022 by Peter Finkel et al., entitled "OPTICAL MODULATOR UTILIZING FERRO-ELECTRIC DOMAIN SWITCHING." This application and all other publications and patent documents referred to throughout this nonprovisional application are incorporated herein by reference in their entirety.

FEDERALLY SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case No. 211208-US2.

BACKGROUND OF THE INVENTION

Field of the Invention

The invention relates to optical switching and modulation of light through a ferroelectric relaxor single crystal

Description of the Prior Art

Electromagnetic interference (EMI) can have a detrimental impact on sensitive electronics; therefore, EMI shielding has become a developed field in recent decades. Transparent conductive thin films (TCF) present the most developed approach whereby a conductive film such as Indium Tin Oxide (ITO) is deposited on a polymer substrate allowing microwave radiation to be shielded while transparent in the optical spectrum. ITO has been used in multiple instances where a transparent, yet efficient EMI shielding is required. Other materials including graphene and carbon nanotubes (CNTs) and their composites with polymers have shown effective in shielding EMI, though none have the ability to cycle between opaque and transparent states within the optical electromagnetic spectrum.

Previous methods of optical modulation include polymer-based devices such as liquid crystal films which utilize the reorientation of nematic molecular characteristics. Devices termed "smart windows" have been developed utilizing multiple types of polymer composites and films based on electrochromic effect as found in polymer-dispersed liquid-crystal devices.

Photoelastic optical modulators are devices that utilize a piezoelectric drive to apply a stress onto a birefringent material changing the refractive index of a material.

Pockels cells can modulate the polarization of light through a birefringence change in an optical medium which is driven by an electric field. This represents a linear electro-optical effect modulating the polarization of light passing through a single crystal such as lithium niobate, and when combined with a Brewster window can convert the change of polarization to a change of the transmitted light intensity.

SUMMARY OF THE INVENTION

The purpose of the present invention is to provide an optical switch capable of functioning as an optical limiter, modulator, and dynamic attenuator utilizing a relaxor ferroelectric single crystal as the functional medium. In particular, the functionality is based upon a dynamic ferroelectric-to-ferroelectric phase transition occurring in the single crystal which is chosen with doping properties near a morphotropic phase boundary and can be perturbed through a hysteretic transition from an opaque to transparent state through the application of a compressive stress and/or an electric field to the crystal.

Described herein is a broadband optical switch capable of modulating the intensity of light in the visible and infrared frequency range utilizing a single crystal ferroelectric relaxor through the application of stress and/or electric field across the single crystal.

Sensitive electronic systems including sensors and optical receivers require a transparent material when in an operational mode, yet when dormant can be protected through the above-described phenomenon. The present invention can be modulated via stress, electrical excitation, or a combination of both to provide a limiter or switch by changing optical opacity of a ferroelectric material. By exploiting a stress and/or voltage induced phase transformation the ferroelectric single crystal can be utilized as EMI shielding, optical switch or optical limiter in multiple technological applications.

The present invention utilizes the optical response of $Pb(In_{1/2}\ Nb_{1/2})O_3$—$Pb(Mg_{1/3}Nb_{2/3})O_3$—$PbTiO_3$ (PIN-PMN-PT) single crystals undergoing an induced phase transformation to limit or shield electromagnetic radiation for sensitive electronic system protection. Operational conditions of technical electronic systems often require shielding from electromagnetic radiation, though in circumstances where the system is a sensor there is a requirement to dynamically actuate the screening. Techniques available to date are not able to modulate their optical properties between opaque and transparent states at high speeds, whereas utilizing a stressed single crystal of PIN-PMN-PT, makes it possible to electrically modulate the optical properties. Exploiting the phase transformation inherently found in the ferroelectric materials through stress and electrical bias can change the transmissivity in fine steps rather than relying on a threshold effect as in nematic materials. This allows fabrication of an optical limiter or switch that operates in a specific opacity range rather than only being in the ON or OFF state. The phase transition and therefore fundamental property needed for the optical limiter does not rely on the crystal size allowing for a thinner crystal (~100 um) to be utilized and thus a much smaller force needed to apply the same stress on the crystal. The combination of electrical bias and stress states combine to make the optical limiter, shielding or switch to operate reversibly and on demand without degradation.

The present invention provides the following advantages: contact-less, remote triggering of phase transition conditions allowing for transformational voltage generation and changing the optical properties; tuning the transition by combination of electrical bias and stress states combine to make the optical limiter, shielding or switch to operate reversibly and on demand without degradation; and it allows a broadband of operating frequencies—optimal for low (near DC) to high operating frequencies without a change in performance. There is currently no optical switch utilizing the domain reconfiguration of a single crystal relaxor ferroelectric material as the optical modulating medium.

A wavelength range over the visible (380-750 nm) and near-infrared (759-1,400 nm) spectrum provides a broadband attenuation, while wavelengths in the short-wavelength infrared spectrum (1,400-3,000 nm) have a frequency dependent attenuation and light in the mid-wavelength infrared spectrum (3,000-8,000 nm) are not or negligibly attenuated.

The combination of bias and dynamic stress, electric field, or both can be utilized to drive the dynamic transmission of light through the single crystal relaxor ferroelectric medium.

The doping of a single crystal was chosen near the morphotropic phase boundary (MPB) such as $xPb(In_{1/2}Nb_{1/2})O_3$-(1-x-y)$Pb(Mg_{1/3}Nb_{2/3})O_3$-$yPbTiO_3$ (PIN-PMN-PT) with x~0.24 and y~0.30.

Phase switching between ferroelectric states greatly reduces the required switching voltages and increases device lifetime.

Increased rise and fall time between switching can be achieved when switching between opaque and transparent states utilizing a bias stress and dynamic ac electric field.

These and other features and advantages of the invention, as well as the invention itself, will become better understood by reference to the following detailed description, appended claims, and accompanying drawings.

BRIEF DESCRIPTION OF THE DRAWINGS

FIG. 2A shows the optical transmittance with sample under a −40 MPa stress load plotted in gray and unloaded (~0 MPa) in black measured at the sample and 0.6 m away. FIG. 2B shows the visual transmission observations of PIN-PMN-PT crystal at 0 MPa. FIG. 2C shows the visual transmission observations of PIN-PMN-PT crystal at −40 MPa.

FIG. 4A depicts a filter/modulator/switch device with no stress and/or voltage applied to the ferroelectric single crystal (opaque state). FIG. 4B depicts a filter/modulator/switch device with stress and/or voltage applied to the ferroelectric single crystal (transparent state).

DETAILED DESCRIPTION OF THE INVENTION

The present invention provides for optical switching and modulation of light through a single crystal ferroelectric relaxor whereby stress and/or electric fields are utilized to control the transmission of light through the medium occurring during the domain reconfiguration during a phase transition from a low stress/voltage to high stress/voltage. This invention uses a single material without the need for a polarizer, such as a Brewster window.

This device exploits the domain reconfiguration of a phase transition inherent in poled single crystal ferroelectric relaxor crystals which are inherently opaque when under no mechanical or electrical load and become transparent when a mechanical stress, an electric field, or both is applied to the crystal.

Whereas this device can operate as an optical switch over a broadband wavelength range of the optical spectrum, it can also be operated concurrently as a dynamic optical filter whereby the longer wavelength spectrums are transparent.

A single crystal relaxor ferroelectric medium is utilized as the active component of the filter/switch/modulator/attenuator with doping near the morphotropic phase boundary (MPB) such as $xPb(In_{1/2}Nb_{1/2})O_3$-(1-x-y)$Pb(Mg_{1/3}Nb_{2/3})O_3$-$yPbTiO_3$ (PIN-PMN-PT) with x~0.24 and y~0.30.

The optical limiter/switch prototype for preliminary testing uses a mechanically and electrically biased PIN-PMN-PT single crystal with dimensions of 4×4×12 $mm^3$ as a basis for design. Crystals were [011]-cut and electrically poled with Cr/Au electrodes on the (011) faces. This domain engineering makes it possible to induce a rhombohedral to orthorhombic phase transformation with the application of uniaxial stress along the <100> direction of the crystal (long axis) as diagramed in FIG. 1. The induced phase transformation occurs at some critical stress ($\sigma_c$) that can be accurately determined for each crystal, as shown in the transmittance plotted in FIG. 1.

Figure 1:
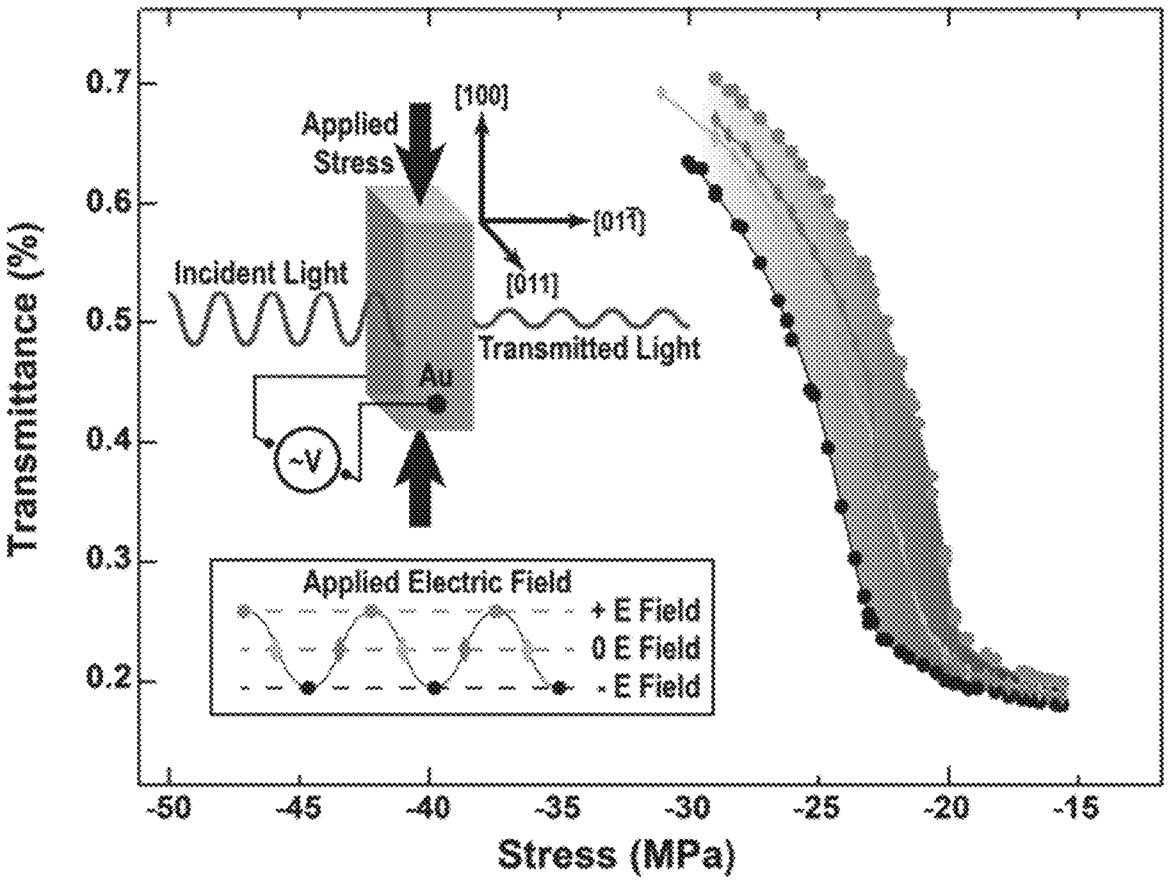
FIG. 1 is plot of the optical transmittance of PIN-PMN-PT. Dynamic transmittance measurement is shown during stress loading with data obtained at points illustrated by applied electric field inset diagram.

At low stresses (<20 MPa) the PIN-PMN-PT single crystal is highly opaque and can become more transparent by increasing the stress, applying either a positive or negative electric field through the Au contacts, or both. The inset of FIG. 1 illustrates how applying stress along the <100> direction changes the amount of light that is transmitted through the crystal through the <0-11> direction. Additionally, applying an electric field through the <011> direction can also change the opacity of the crystal as noted by the grey and black markers in the applied electric field inset of FIG. 1.

A single crystal relaxor ferroelectric material near the MPB such as PIN-PMN-PT is naturally in a metastable state whereby small perturbations resulting from stress or electric fields will promote a hysteretic phase transition from a ferroelectric rhombohedral opaque state to a ferroelectric orthorhombic transparent state.

The phase transition occurring in the relaxor ferroelectric medium can be driven at high speeds with low rise and fall times using an electric field applied across the poling direction of the crystal making it possible to be utilized as a dynamic attenuator and modulator for visible and infrared radiation.

A combination of static and dynamic electric fields and stresses can be applied to the single crystal whereby the effective reduction of electric field needed to cycle the hysteretic switching can be achieved by applying an appropriate pre-stress to the crystal. It is also possible for the converse effect to achieve dynamic switching where a bias electric field brings the single crystal within the applicable stress range able to achieve a full hysteresis. Additionally, the combination of a dynamic stress and dynamic electric field to achieve the optical modulation is possible.

Figure 2A:
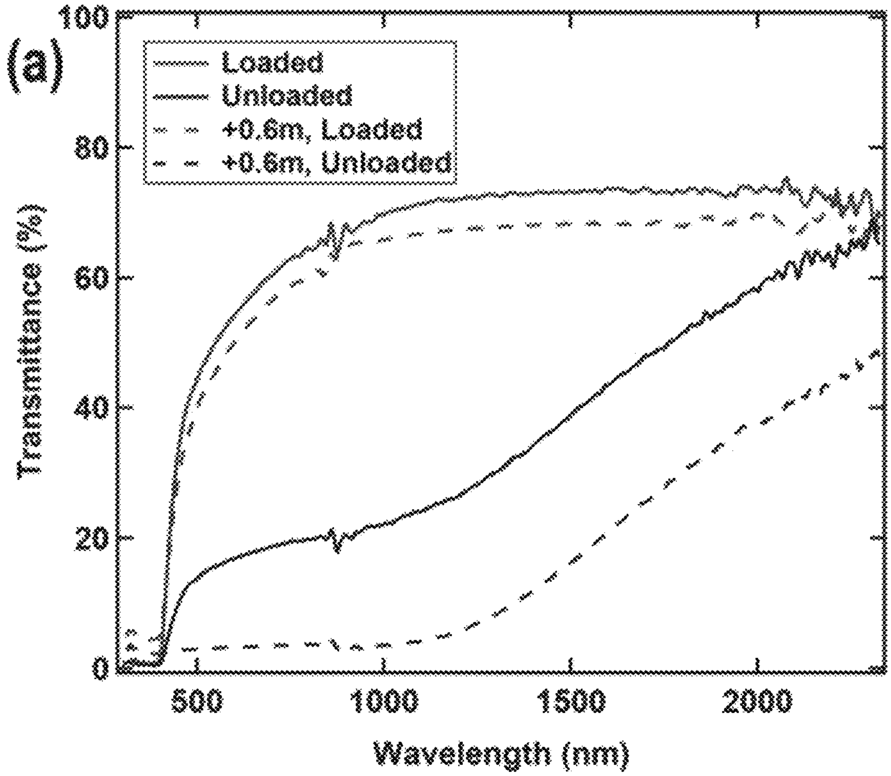
FIGS. 2A-2C show the optical transmittance of a relaxor ferroelectric PIN-PMN-PT single crystal.

The optical measurements of PIN-PMN-PT from the UV to IR spectrum are plotted in FIG. 2A for both the loaded (−40 MPa) and unloaded (0 MPa) cases. This illustrates the optical wavelengths that the switch or limiter is functional.

Figure 2B:
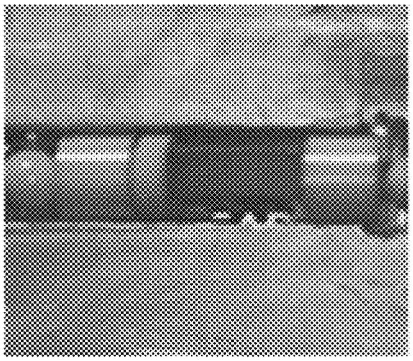
Figure 2C:
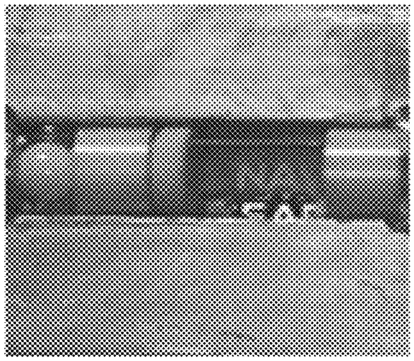

The basic design of the shielding/limiter places the single crystal in a fixture where a bias stress places the single crystal near the phase transition and electrical contacts that are accessible to drive the crystal with a bias voltage. FIGS. 2B and 2C illustrate the operational functionality of the single crystal where the image in FIG. 2B is that of the crystal in the low stress rhombohedral state and FIG. 2C is in the high stress orthorhombic state.

This design does not rely on the dynamic response of the birefringence of a material, but exploits a phase transition whereby the domain reconfiguration occurring within the single crystal relaxor ferroelectric modulates the scattering of light waves occurring as they travel through the medium. As a caveat, this statement does not infer that this crystal does not have a changing birefringence.

In a preferred embodiment, a single crystal comprising a relaxor ferroelectric material, chosen here to be PIN-PMN-PT, specifically $xPb(In_{1/2}Nb_{1/2})O_3$-$(1$-$x$-$y)Pb(Mg_{1/3}Nb_{2/3})O_3$-$yPbTiO_3$ with x~0.24 and y~0.30, of high quality with minimal defects is mechanically cut into a rectangular bar shape several mm in size and highly polished on all sides (FIG. 4). The PIN-PMN-PT crystal has electrodes formed on opposite sides (FIG. 4) and polled along the electrode direction before being placed in the device. Electrodes are comprised preferably of gold or titanium-gold deposited by physical vapor techniques but may be any other suitable electrode material capable of adhesion without delamination.

Figure 3:
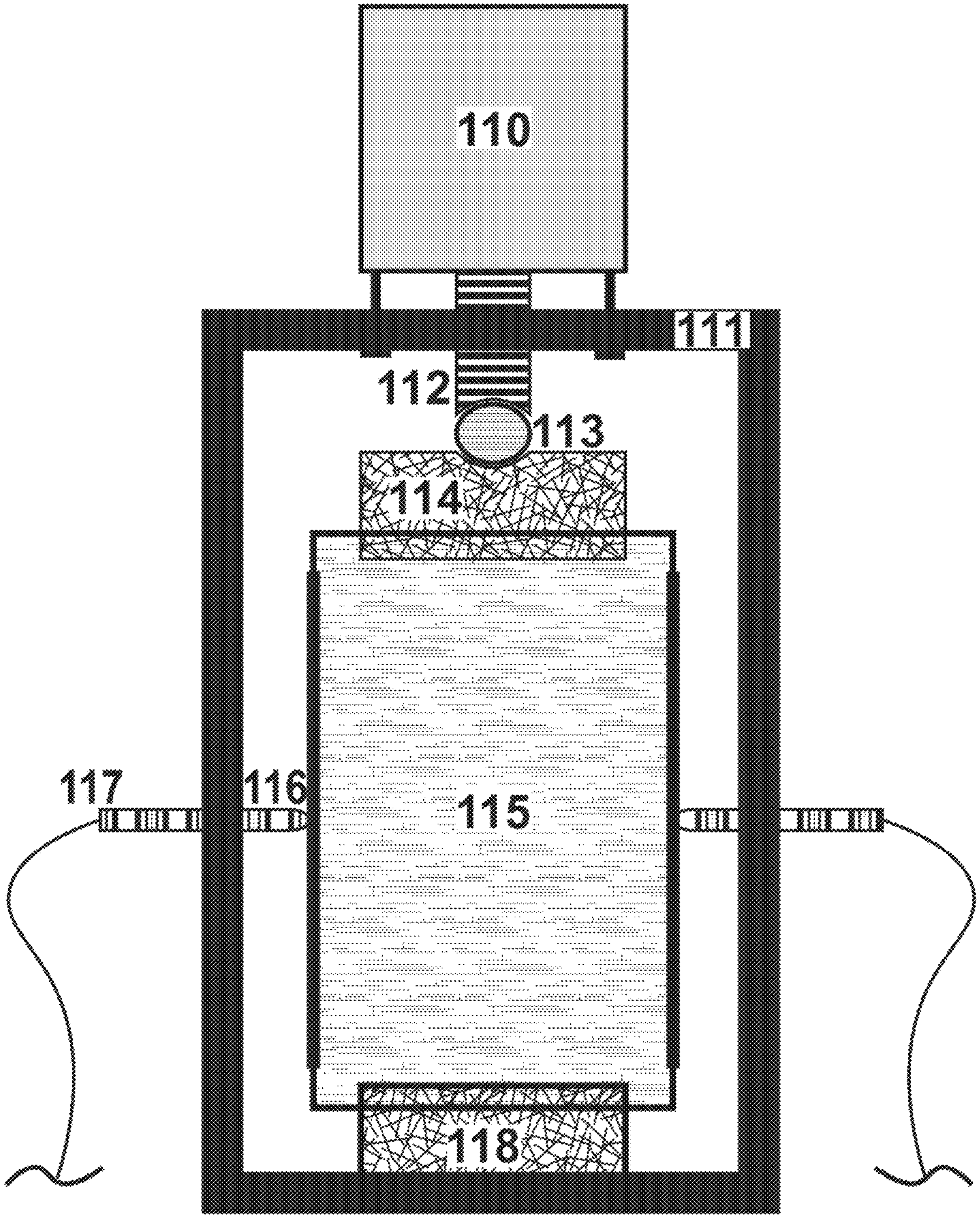
FIG. 3 is a schematic of an optical modulator/switch device.

Referring to FIG. 3, the PIN-PMN-PT single crystal 115 is placed in a device housing 111, which is a nonconductive structure frame to facilitate mounting of components. The single crystal 115 is a polished and polled single crystal of ferroelectric material with a composition near the morphotropic phase boundary, and it has electrodes 116 deposited on sides perpendicular to the filtering direction. A top crystal placement setting 114 and a bottom crystal placement setting 118 are used for mounting and affixing the crystal 115 in place. The top crystal placement setting 114 is a ceramic bracket for maintaining placement of the single crystal and dispersing stress from a bias stress stage 110 across a surface of the crystal, and it has a concave notch on to accommodate a ceramic sphere 113. The bottom crystal placement setting is a ceramic bracket for maintaining placement of the single crystal 115 and providing a contact point with the device housing 111. The single crystal 115 is oriented with the non-electrode sides facing parallel to a bias stress stage 110 and electrode sides facing perpendicular to the bias stress stage 110. The concave indention in the top crystal placement setting 114 allows for placement and alignment with a ceramic sphere 113 and, combined with a bias stress connector rod 112 which also has a concave indention, serves as a ball joint to apply dynamic stress evenly to the single crystal 115 surface and prevent damage of the crystal 115 during cycling. The bias stress connector rod 112 protrudes from the bias stress stage 110 through a bore hole in the device housing 111 and impinges on the ceramic sphere 113 to apply stress onto the top crystal placement setting 114. The bias stress connector red 112 has a concave end to accommodate the ceramic sphere 113. The ceramic sphere 113 is a ball joint connector for distributing stress evenly to the single crystal 115. The bias stress stage 110 is an electrically controlled stress stage that is pressure sensor mounted to the device housing 111 to provide compressive stress through an end effector comprising the bias stress connector rod 112, the ceramic sphere 113, and the top crystal placement setting 114. Thin film electrodes 116 are deposited on opposing sides of the single crystal 115 and are used for polling and applying an electric voltage provided by electrical contacts 117. The electrical contacts 117 have spring loaded contact points to provide voltage to electrodes 116. As an alternative embodiment, electrical wires may be attached using silver epoxy or any appropriate material.

A static and/or dynamic stress can be applied to the single crystal 115 through the bias stress connector rod 112 using an electrically driven bias stress stage 110, which is physically mounted to the device housing 111. The force provided by the bias stress stage 110 travels through the bias stress connector rod 112, ceramic sphere 113, and top crystal placement setting 114 to the crystal 115, whereby it experiences a compressive stress when forced against the bottom of the device housing 111 through the bottom crystal placement setting 118.

Two spring loaded electrical contacts 117 are mounted to the sides of the device housing 111 adjacent to the electrodes 116, and the electrical contacts have leads for application of an ac electric field, a dc electric field, or both. These leads are physically mounted to the housing with a few mm of the end to be comprised of a conductive tip with a spring backer as not to apply stress along the direction of the electrodes. It is possible to convert this design into permanent lead wires that are physically attached to the crystal using conductive silver epoxy or any appropriate method capable of application without heating the crystal when applied.

Figure 4A:
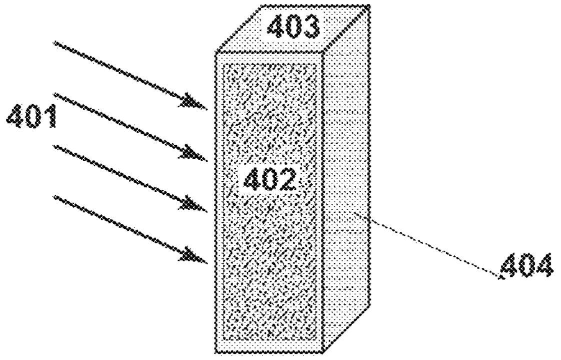
FIGS. 4A and 4B show different states of a filter/modulator/switch device.
Figure 4B:
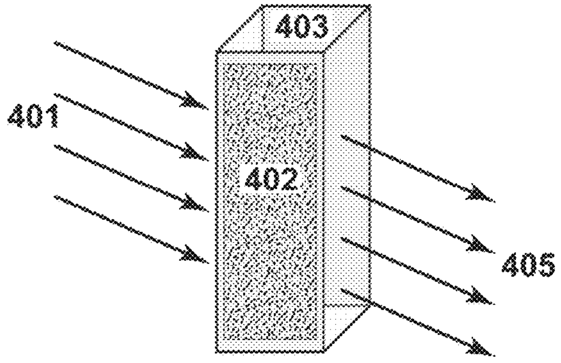
Figure 5:
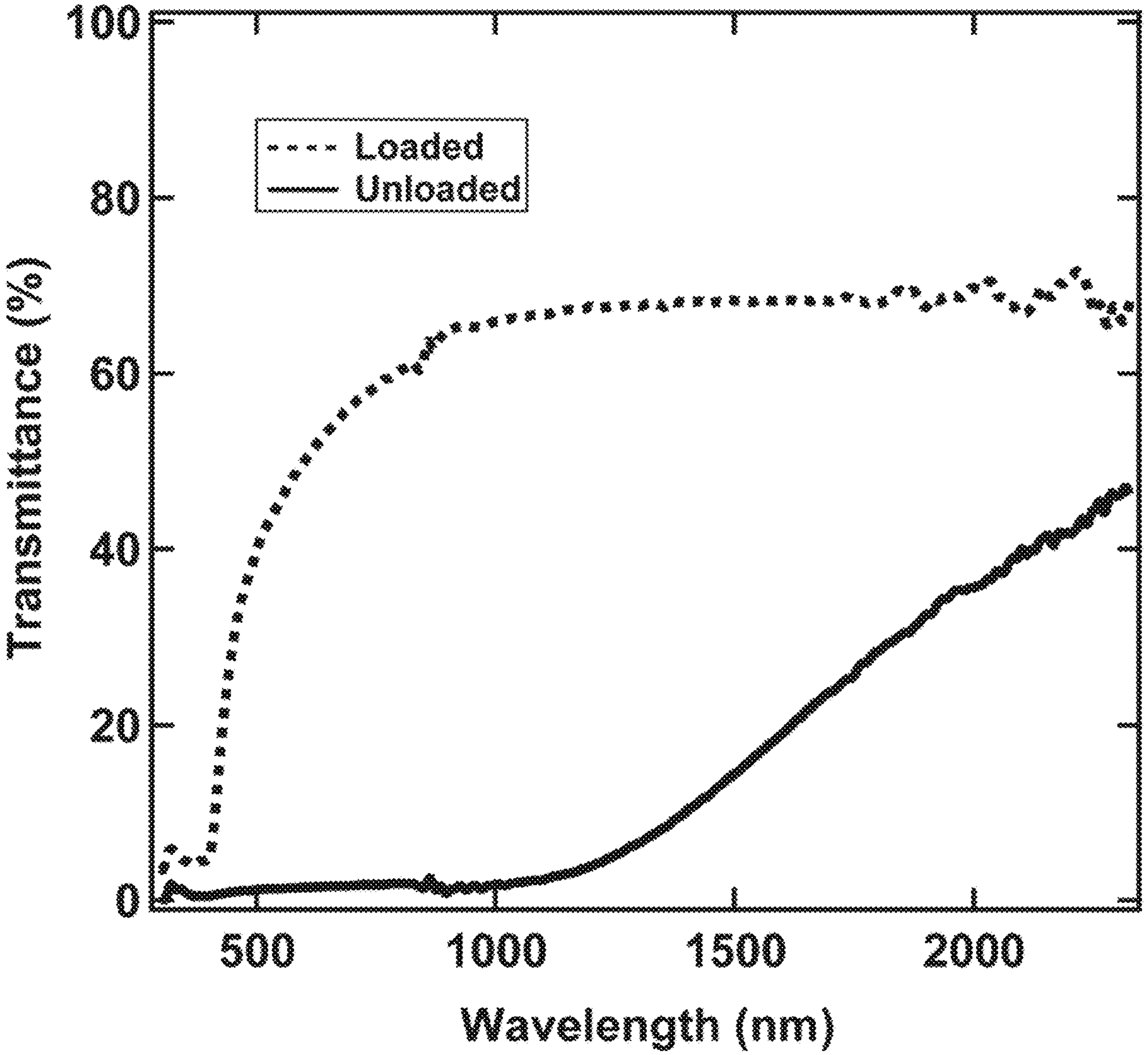
FIG. 5 shows the transmittance of light through the ferroelectric single crystal under stress and/or voltage load.

During operation, light rays are impingent upon the highly polished surface described in FIGS. 4A and 4B perpendicular to the electrode surfaces and light is measured or utilized on the opposing side of the crystal. FIG. 4A depicts a filter/modulator/switch device with no stress and/or voltage applied to the ferroelectric single crystal (opaque state). FIG. 4B depicts a filter/modulator/switch device with stress and/or voltage applied to the ferroelectric single crystal (transparent state). Incoming light rays 401 are directed into a ferroelectric single crystal PIN-PMN-PT 403 with gold electrodes 402 on the surface. When no stress is applied to the single crystal 403, transmitted light rays 404 are diminished by scattering occurring in the opaque state of the single crystal 403. When stress is applied to the single crystal 403, transmitted light rays 405 are undiminished by scattering not occurring in the transparent state of the single crystal 403. Application of an electric field, a stress, or both will cause the crystal to undergo a phase transition cycling from a low stress/low electric field opaque state to a transparent state in the high stress/high electric field state. FIG. 5 illustrates the optical properties of the device with a PIN-PMN-PT single crystal that are obtained when the device is under a load (dashed line) or the load is removed (unloaded—solid line), where a load discussed here is either a compressive stress or an electric field.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method of light modulation, comprising placing a single crystal in a device housing, wherein the single crystal has a top side, a bottom side, and two opposing middle sides;

placing electrodes on the two opposing middle sides of the single crystal;

attaching electrical contacts to the electrodes, thereby forming a light modulation system comprising the single crystal, the electrodes, and the electrical contacts, the electrical contacts, in operation, providing voltage to the electrodes and forming an electric field;

attaching a compression stress source to the top side of the single crystal;

applying the electric field to the single crystal and applying a compression stress to the crystal, or applying both;

dynamically switching a reversible phase transformation between an opaque state and a transparent state of the single crystal, wherein the reversible phase transformation comprises a reversible rhombohedral to orthorhombic phase transformation.

2. The method of claim 1, wherein the crystal comprises $Pb(In_{1/2}Nb_{1/2})O_3—Pb(Mg_{1/3}Nb_{2/3})O_3—PbTiO_3$.

3. The method of claim 1, wherein the compression stress source comprises a bias stress stage, a bias stress connector rod, a ceramic sphere, and a crystal placement setting.

4. The method of claim 1, wherein the light modulation system does not include a polarizer.

5. The method according to claim 1, wherein the single crystal comprises a <100> direction and a <011> direction, wherein said applying the electric field to the single crystal applying a compression stress to the crystal, or applying both comprises at least one of:

applying the compression stress along the <100> direction; and applying the electric field through the <011> direction.

6. An optical system component, comprising a single crystal having a top side, a bottom side, and two opposing middle sides;

electrodes on the two opposing middle sides of the single crystal;

electrical contacts to provide voltage to the electrodes; and a compression stress source to apply stress to the top side of the single crystal, so that, in operation, the voltage and the stress causes a reversible phase transformation between an opaque state and a transparent state of the single crystal, the reversible phase transformation comprising a reversible rhombohedral to orthorhombic phase transformation.

7. The component of claim 6, wherein the crystal comprises $Pb(In_{1/2}Nb_{1/2})O_3—Pb(Mg_{1/3}Nb_{2/3})O_3—PbTiO_3$.

8. The component of claim 6, wherein the compression stress source comprises a bias stress stage, a bias stress connector rod, a ceramic sphere, and a crystal placement setting.

9. The component of claim 6, wherein the optical system component does not include a polarizer.

10. The component according to claim 6, wherein the single crystal comprises a <011> direction, wherein said electrodes are situated to provide the voltage through the <011> direction.

11. The component according to claim 6, wherein the single crystal comprises a <100> direction, wherein said compression stress source is situated to apply the stress along the <100> direction of the single crystal.

12. The component of claim 6, wherein the crystal comprises [011]-electrically poled $Pb(In_{1/2}Nb_{1/2})O_3—Pb(Mg_{1/3}Nb_{2/3})O_3—PbTiO_3$.

13. The component of claim 6, wherein the crystal comprises a doping near a morphotropic phase boundary.

14. The component of claim 13, wherein the crystal comprises $xPb(In_{1/2}Nb_{1/2})O_3$-(1-x-y) $Pb(Mg_{1/3}Nb_{2/3})O_3$-$yPbTiO_3$ (PIN-PMN-PT) with x~0.24 and y~0.30.

* * * * *